(12) United States Patent
Murao (10) Patent No.: US 12,525,905 B2
(45) Date of Patent: Jan. 13, 2026

(54) GENERATOR CONTROL METHOD AND GENERATOR CONTROL DEVICE

(71) Applicant: NISSAN MOTOR CO., LTD., Yokohama (JP)

(72) Inventor: Kazuhiro Murao, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/848,051

(22) PCT Filed: Mar. 18, 2022

(86) PCT No.: PCT/JP2022/012922
§ 371 (c)(1),
(2) Date: Sep. 17, 2024

(87) PCT Pub. No.: WO2023/175992
PCT Pub. Date: Sep. 21, 2023

(65) Prior Publication Data
US 2025/0112571 A1 Apr. 3, 2025

(51) Int. Cl.
*H02P 9/04* (2006.01)
*F02D 29/06* (2006.01)
*F02D 41/00* (2006.01)
*F02D 41/04* (2006.01)

(52) U.S. Cl.
CPC ............... *H02P 9/04* (2013.01); *F02D 29/06* (2013.01); *F02D 41/009* (2013.01); *F02D 41/04* (2013.01)

(58) Field of Classification Search
CPC .......... H02P 9/04; F02D 29/06; F02D 41/009; F02D 41/04
See application file for complete search history.

(56) References Cited

U.S. PATENT DOCUMENTS

| 2004/0255904 A1* | 12/2004 | Izawa ................. B60L 50/16 477/3 |
| 2008/0223341 A1 | 9/2008 | Kamada |
| 2010/0036590 A1 | 2/2010 | Nakai |

(Continued)

FOREIGN PATENT DOCUMENTS

| EP | 1 591 657 A2 | 11/2005 |
| JP | 2001-304080 A | 10/2001 |

(Continued)

OTHER PUBLICATIONS

English translation of Nakai (JP 4811741) (Year: 2011).*
English translation of Okamura (JP 2012136980) (Year: 2012).*
English translation of Ito (JP 2019077282) (Year: 2019).*

*Primary Examiner* — Kyle J Kingsland
(74) *Attorney, Agent, or Firm* — Foley & Lardner LLP (57) ABSTRACT

Provided is a generator control method for controlling a generator driven by an engine via a crankshaft of the engine. In this generator control method, it is determined whether the engine stops, and when it is determined that the engine stops, the generator is operated to adjust a crank position of the crankshaft to a prescribed target stop position. It is also determined whether a cylinder internal pressure of the engine is equal to or greater than a prescribed threshold, and when the cylinder internal pressure is equal to or greater than the threshold, the operation on the generator is continued to maintain the crank position at the target stop position.

7 Claims, 8 Drawing Sheets

(56) References Cited

U.S. PATENT DOCUMENTS

| | | | | |
|---|---|---|---|---|
| 2012/0309587 A1* | 12/2012 | Nozaki | ................ | B60W 10/02 |
| | | | | 180/65.265 |
| 2017/0240053 A1 | 8/2017 | Hino | | |
| 2018/0009431 A1 | 1/2018 | Akuzawa | | |
| 2019/0242352 A1 | 8/2019 | Hoshino | | |
| 2023/0184187 A1* | 6/2023 | Takahashi | ............. | F02P 5/1502 |
| | | | | 701/102 |
| 2024/0229731 A1* | 7/2024 | Oryoji | .................... | F02D 37/02 |

FOREIGN PATENT DOCUMENTS

| | | | |
|---|---|---|---|
| JP | 2005-315203 A | | 11/2005 |
| JP | 2008-223669 A | | 9/2008 |
| JP | 2010-043532 A | | 2/2010 |
| JP | 4811741 B2 * | | 11/2011 |
| JP | 2012136980 A * | | 7/2012 |
| JP | 2014-000834 A | | 1/2014 |
| JP | 2018-002107 A | | 1/2018 |
| JP | 2019077282 A * | | 5/2019 |
| WO | WO-2016/084802 A1 | | 6/2016 |

* cited by examiner

GENERATOR CONTROL METHOD AND GENERATOR CONTROL DEVICE

TECHNICAL FIELD

The present invention relates to a generator control method and a generator control device.

BACKGROUND ART

JP2018-002107A discloses a vehicle that executes crank position control for stopping a crankshaft of an engine at a desired target stop position by braking the crankshaft by an alternator (generator) when the engine stops. In this crank position control, the crank position is controlled by controlling the alternator (generator) to generate a braking torque against the crankshaft.

SUMMARY OF INVENTION

However, in the above crank position control, there is a problem that the crank position deviates from the target stop position due to a reaction force caused by a cylinder internal pressure remaining in a cylinder after the stop of the engine, and settling accuracy of the crankshaft decreases.

Therefore, an object of the present invention is to provide a generator control method and a generator control device capable of more reliably maintaining the crank position at the target stop position after the engine stops.

According to one aspect of the present invention, there is provided a generator control method for controlling a generator driven by an engine via a crankshaft of the engine. In this generator control method, it is determined whether the engine stops, and when it is determined that the engine stops, the generator is operated to adjust a crank position of the crankshaft to a prescribed target stop position. It is also determined whether a cylinder internal pressure of the engine is equal to or greater than a prescribed threshold, and when the cylinder internal pressure is equal to or greater than the threshold, the operation on the generator is continued to maintain the crank position at the target stop position.

DESCRIPTION OF EMBODIMENTS

Embodiments of the present invention will be described below with reference to the drawings.

First Embodiment

Figure 1:
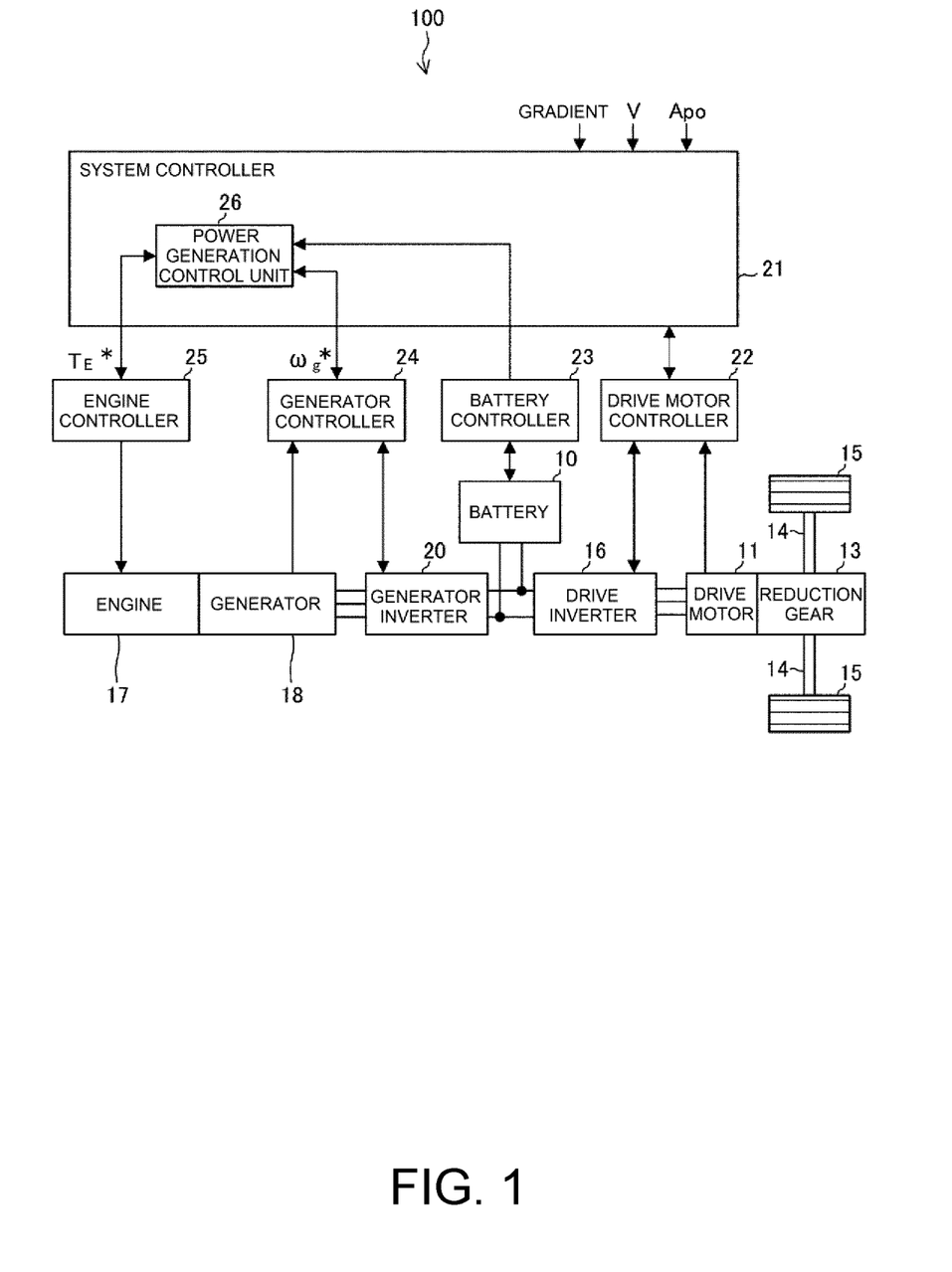
FIG. 1 is a block diagram illustrating a main configuration of an electric vehicle in which a generator control method according to each embodiment is executed.

FIG. 1 is an explanatory diagram showing a schematic configuration of an electric vehicle 100. As shown in FIG. 1, the electric vehicle 100 is a vehicle that is driven by electric power of a battery 10, and includes a drive motor 11 and a power generation device 12. Especially, in the present embodiment, an example in which the electric vehicle 100 is configured as a so-called series hybrid vehicle will be described.

The battery 10 stores electric power for driving each unit of the electric vehicle 100. The battery 10 is chargeable. In the present embodiment, the battery 10 is charged with at least electric power generated by the power generation device 12. In the present embodiment, the battery 10 is a DC power supply. A DC voltage (battery voltage $V_{dc}$) output from the battery 10 can be detected by a sensor (not shown) or the like.

The drive motor 11 is an electric motor (particularly, a three-phase AC motor) that functions as a traveling drive source of the electric vehicle 100. The drive motor 11 is connected to the battery 10 via a drive inverter 16.

The drive motor 11 (more specifically, an output shaft of the drive motor 11) is connected to driving wheels 15 via a transmission mechanism such as a reduction gear 13 and a drive shaft 14. Accordingly, the drive motor 11 receives the electric power from the battery 10 during power running operation (during acceleration of the electric vehicle 100 or the like), and transmits a driving force to the driving wheels 15 via the reduction gear 13 or the like. On the other hand, the drive motor 11 applies a regenerative braking force to the driving wheels 15 during regenerative operation (during deceleration of the electric vehicle 100 or the like), and regenerates electric energy obtained by applying the regenerative braking force to the battery 10.

The drive inverter 16 converts the DC power output from the battery 10 into AC power and supplies the AC power to the drive motor 11 during the power running operation of the drive motor 11. The drive inverter 16 converts the AC power generated by the drive motor 11 into DC power during regenerative operation of the drive motor 11.

An engine 17 is a so-called internal combustion engine, and functions as a power generation source of the power generation device 12. Note that parameters related to an operation state of the engine 17, such as a rotation speed of the engine 17, can be appropriately detected by a sensor (not shown) or the like.

A generator (electric power generator) 18 is an electric motor (particularly, a three-phase AC motor) including a rotor connected to a crankshaft of the engine 17 and a stator provided with a magnet, a winding, and the like. The generator 18 is connected to the battery 10 via a generator inverter 20. The generator 18 applies a regenerative braking force (braking torque) to the crankshaft of the engine 17 during regenerative operation (during power generation), and regenerates electric energy obtained by applying the regenerative braking force to the battery 10.

The generator inverter 20 converts AC power generated by the generator 18 into DC power during regenerative operation of the generator 18. On the other hand, the generator inverter 20 converts DC power output from the battery 10 into AC power and supplies the AC power to the generator 18 when the generator 18 is in power running operation. As a result, when the engine 17 is started, the engine 17 is cranked by causing the generator 18 to perform power running operation. Further, the electric power of the battery 10 can also be consumed by causing the generator 18 to perform the power running operation depending on a situation and causing the engine 17 to idle (to perform motoring).

Note that hereinafter, a detection value of a current flowing through the U-phase of the generator 18 is referred to as a U-phase current $I_u$, and a detection value of a current flowing through the V-phase is referred to as a V-phase current $I_v$, and a detection value of a current flowing through the W-phase is referred to as a W-phase current $I_w$. A detection value of a d-axis current of the generator 18 is referred to as a d-axis current $I_d$, and a detection value of a q-axis current is referred to as a q-axis current $I_q$. The d-axis current $I_d$ and the q-axis current $I_q$ of the generator 18 may be collectively referred to as dq-axis currents $I_d$, $I_q$.

The electric vehicle 100 includes a system controller 21, a drive motor controller 22, a battery controller 23, a generator controller 24, and an engine controller 25 as various control devices. In the present embodiment, the system controller 21 includes a power generation control unit 26.

The system controller 21 is a host control unit that integrally controls each unit of the electric vehicle 100 using vehicle information. Here, the vehicle information includes parameters representing an operation state or the like of each unit constituting the electric vehicle 100. The vehicle information includes, for example, an accelerator opening Apo which is an operation amount on an accelerator pedal by a driver, a vehicle speed V, and a gradient and the like of a traveling road surface of the electric vehicle 100. The vehicle information can be determined based on detection values of various sensors (not shown) or the like.

The system controller 21 calculates a command value of an output torque of the drive motor 11 (hereinafter, simply referred to as a "drive motor torque command value") according to the vehicle information, a state of charge (SOC) of the battery 10 input from the battery controller 23, an available input power, an available output power, a target generated power described later, and the like. The system controller 21 outputs the calculated drive motor torque command value to the drive motor controller 22.

The system controller 21 (especially, the power generation control unit 26) calculates the target generated power of the generator 18 based on the vehicle information, the SOC of the battery 10 input from the battery controller 23, the available input power, and the available output power.

Further, the power generation control unit 26 controls operating points of the engine 17 and the generator 18 based on the target generated power. Specifically, the power generation control unit 26 calculates a rotation speed command value $\omega_g^*$ and an engine torque command value $T_E^*$ from the target generated power.

Here, the rotation speed command value $\omega_g^*$ is a command value for a rotation speed (rotation angular velocity) to be maintained by the generator 18 in order to implement the generation of the target generated power. The engine torque command value $T_E^*$ is a command value for a torque to be output by the engine 17 in order to achieve the target generated power by the power generation device 12.

Then, the power generation control unit 26 outputs the calculated rotation speed command value $\omega_g^*$ and the engine torque command value $T_E^*$ to the generator controller 24 and the engine controller 25, respectively.

The drive motor controller 22, the battery controller 23, the generator controller 24, and the engine controller 25 are subordinate control units that individually control the respective units of the electric vehicle 100 based on commands from the system controller 21.

The drive motor controller 22 switches the drive inverter 16 based on the drive motor torque command value in accordance with states of the drive motor 11 such as the rotation speed and the voltage.

The battery controller 23 acquires a temperature, a voltage, a current, an internal resistance, the SOC, the available input power, and the available output power of the battery 10 with reference to detection values of sensors (not shown). Then, the battery controller 23 outputs the acquired SOC, the available input power, the available output power, and the like to the system controller 21.

The generator controller 24 controls the operating point of the generator 18. More specifically, the generator controller 24 receives the rotation speed command value $\omega_g^*$ and the like acquired from the system controller 21, and switches the generator inverter 20. Especially, the generator controller 24 of the present embodiment controls the rotation speed of the generator 18 by rotation speed control in which a detection value of the rotation speed of the generator 18 acquired by a rotation speed sensor 37 (see FIG. 2) (hereinafter, also simply referred to as "rotation speed detection value $\omega_g$") is fed back. The configuration of the generator controller 24 will be described in detail later.

The engine controller 25 controls the operating point of the engine 17. More specifically, the engine controller 25 receives the engine torque command value $T_E^*$ and the like acquired from the system controller 21, and operates various actuators (throttle valve, ignition, fuel injector, and the like) of the engine 17. In this way, the engine 17 operates so as to achieve the target generated power described above. When the engine controller 25 of the present embodiment detects a stop request for the engine 17 (a stop command to the engine 17) according to an operation by an occupant of the electric vehicle 100, a command from the system controller 21, or the like, the engine controller 25 executes stop processing of the engine 17 (stop of ignition processing, fuel cut, or the like) and generates an engine stop request flag Enf. Then, the engine controller 25 outputs the engine stop request flag Enf to the generator controller 24 via the system controller 21.

The system controller 21, the drive motor controller 22, the battery controller 23, the generator controller 24, and the engine controller 25 are each implemented by one or more pieces of computer hardware including a central processing unit (CPU), a random access memory (RAM), an input/output interface (I/O interface), and the like. Each controller is programmed to execute various controls performed in the present embodiment. Note that two or more of these controllers may be implemented by one piece of computer hardware.

Hereinafter, a configuration of a system (hereinafter, simply referred to as "generator system S") including the generator 18, the generator inverter 20, and the generator controller 24, and each processing executed by the generator system S will be described in detail.

Figure 2:
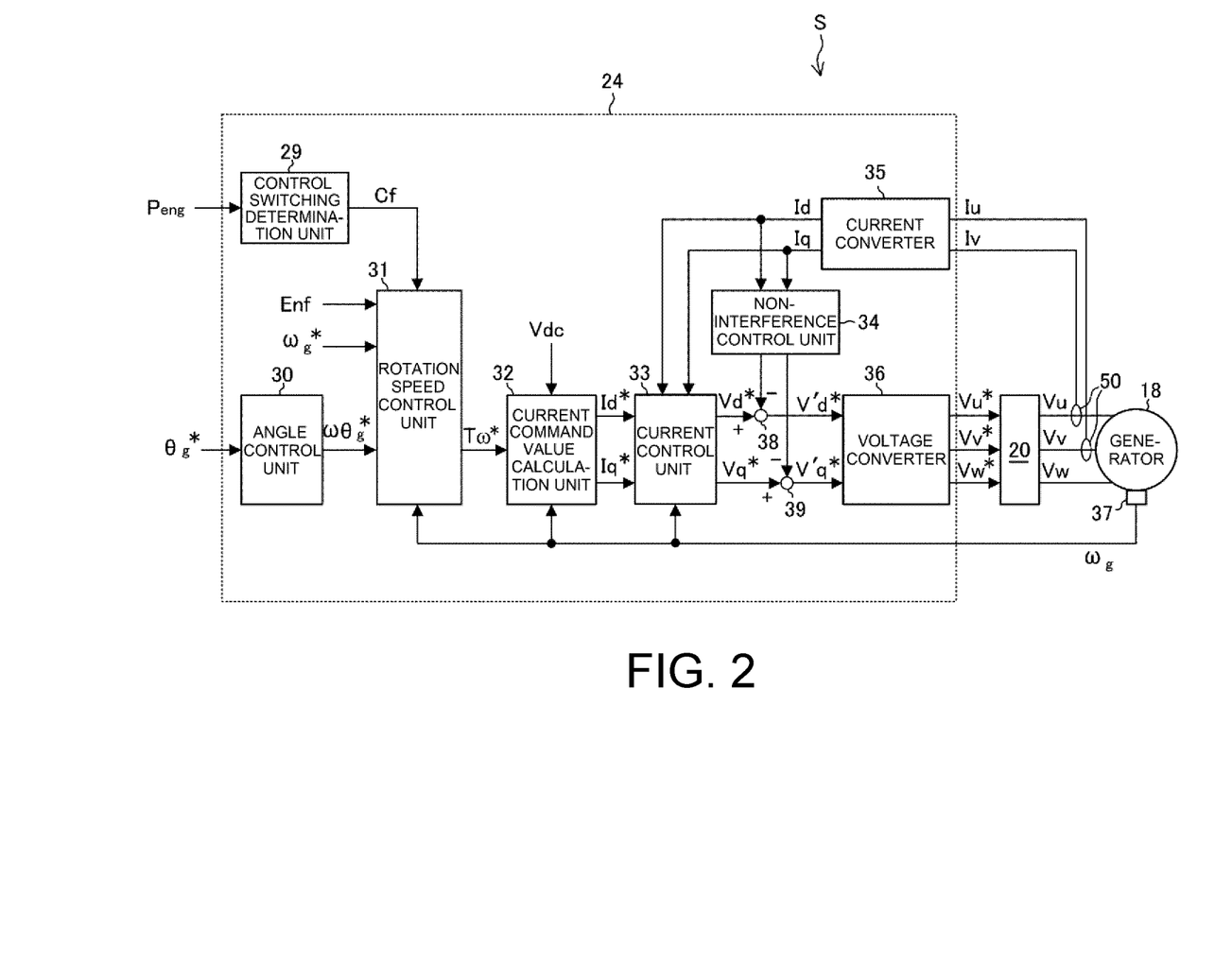
FIG. 2 is a block diagram showing an overall configuration of a generator system.

FIG. 2 is a block diagram showing the configuration of the generator system S. As shown in the drawing, the generator controller 24 functioning as a control device of the generator system S includes a control switching determination unit 29, an angle control unit 30, a rotation speed control unit 31, a current command value calculation unit 32, a current control unit 33, a non-interference control unit 34, a current converter 35, and a voltage converter 36.

The control switching determination unit 29 receives a cylinder internal pressure $P_{eng}$ of the engine 17, and generates a control maintenance flag Cf for instructing maintenance and termination of crank position control. Here, the crank position control in the present embodiment means control that is started with detection of the stop command (the engine stop request flag Enf is set to ON) for the engine 17 as a base point, and operates the operating point of the generator 18 so that a position of the crankshaft (crank position) of the engine 17 approaches a prescribed target stop position.

Specifically, when the cylinder internal pressure $P_{eng}$ of the engine 17 is equal to or greater than a prescribed threshold $P_{ength}$, the control switching determination unit 29 sets the control maintenance flag Cf for instructing execution of the crank position control to ON. On the other hand, when the cylinder internal pressure $P_{eng}$ is less than the threshold $P_{ength}$, the control switching determination unit 29 sets the control maintenance flag Cf to OFF.

Here, the threshold $P_{ength}$ is determined as an appropriate value of the cylinder internal pressure $P_{eng}$ from the viewpoint of determining whether to generate a reaction force to an extent that the crank position is deviated with respect to the crankshaft. Note that when the engine 17 includes a plurality of cylinders, the control switching determination unit 29 uses the maximum value of the cylinder internal pressures of the plurality of cylinders as the "cylinder internal pressure $P_{eng}$", compares the maximum value with the threshold $P_{ength}$, and sets the control maintenance flag Cf to ON or OFF according to the comparison result. Then, the control switching determination unit 29 outputs the set control maintenance flag Cf to a control maintenance flag reference unit 44.

The angle control unit 30 receives an angle command value $\theta_g^*$ of the generator 18 and calculates an angle control rotation speed command value $\omega_{\theta g}^*$. Note that the angle command value $\theta_g^*$ is a command value of an angle (mechanical angle or electric angle) of the generator 18 determined according to the target generated power. The angle command value $\theta_g^*$ is acquired by, for example, integrating the rotation speed command value $\omega_g^*$. The angle control rotation speed command value $\omega_{\theta g}^*$ is a generator rotation speed command value determined in accordance with a difference between the crank position and the target stop position in the crank position control.

The rotation speed control unit 31 refers to the control maintenance flag Cf, and calculates a final torque command value $T_\omega^{**}$ for finally determining an output torque of the generator 18 (hereinafter, also simply referred to as "generator torque $T_\omega$") based on either the rotation speed command value $\omega_g^*$ or the angle control rotation speed command value $\omega_{\theta g}^*$ input from the angle control unit 30. Note that the configuration of the rotation speed control unit 31 will be described in detail later.

The current command value calculation unit 32 receives the final torque command value $T_\omega^{**}$ from the rotation speed control unit 31, the rotation speed detection value $\omega_g$ from the rotation speed sensor 37, and the battery voltage $V_{dc}$, and calculates a d-axis current command value $I_d^*$ and a q-axis current command value $I_q^*$ of the generator 18. The current command value calculation unit 32 outputs the calculated d-axis current command value $I_d^*$ and q-axis current command value $I_q^*$ to the current control unit 33.

The current control unit 33 calculates a d-axis voltage command value $V_d^*$ and a q-axis voltage command value $V_q^*$ of the generator 18 by using the d-axis current command value $I_d^*$, the q-axis current command value $I_q^*$, the d-axis current $I_d$, the q-axis current $I_q$, and the rotation speed detection value $\omega_g$. Note that a non-interference control voltage, which will be described later, is subtracted from the d-axis voltage command value $V_d^*$ and the q-axis voltage command value $V_q^*$ by subtractors 38 and 39, respectively. Then, a d-axis final voltage command value $V'_q^*$ and a q-axis final voltage command value $V'_d^*$ acquired by the subtraction are output to the voltage converter 36.

The non-interference control unit 34 uses the d-axis current $I_d$ and the q-axis current $I_q$ to calculate the non-interference control voltage for reducing a voltage drop due to interference between the d-axis and the q-axis.

The current converter 35 converts currents $I_u$, $I_v$, $I_w$ of three phases into the dq-axis currents $I_d$, $I_q$. The currents $I_u$, $I_v$, $I_w$ of three phases are detected by a current sensor 50 provided between the generator inverter 20 and the generator 18. Note that in the present embodiment, the U-phase current $I_u$ and the V-phase current $I_v$ are detected by the current sensor 50, and the current converter 35 determines the W-phase current $I_w$ by calculation. Then, as described above, the current converter 35 outputs the acquired dq-axis currents $I_d$, $I_q$ to the current command value calculation unit 32 and the non-interference control unit 34.

The voltage converter 36 calculates voltage command values $V_u^*$, $V_v^*$, and $V_w^*$ of each phase of U, V, and W (voltage command values of three phases) from the d-axis final voltage command value $V'_q^*$ and the q-axis final voltage command value $V'_d^*$. The voltage converter 36 outputs the acquired voltage command values $V_u^*$, $V_v^*$, and $V_w^*$ of three phases to the generator inverter 20.

The generator inverter 20 receives the voltage command values $V_u^*$, $V_v^*$, and $V_w^*$ of three phases, and applies a U-phase voltage $V_u$, a V-phase voltage $V_v$, and a W-phase voltage $V_w$ to each phase of the generator 18. In this way, the generator 18 operates at a desired operating point.

Hereinafter, a main part of the generator system S will be described in more detail, focusing on processing in the angle control unit 30 and the rotation speed control unit 31.

Figure 3:
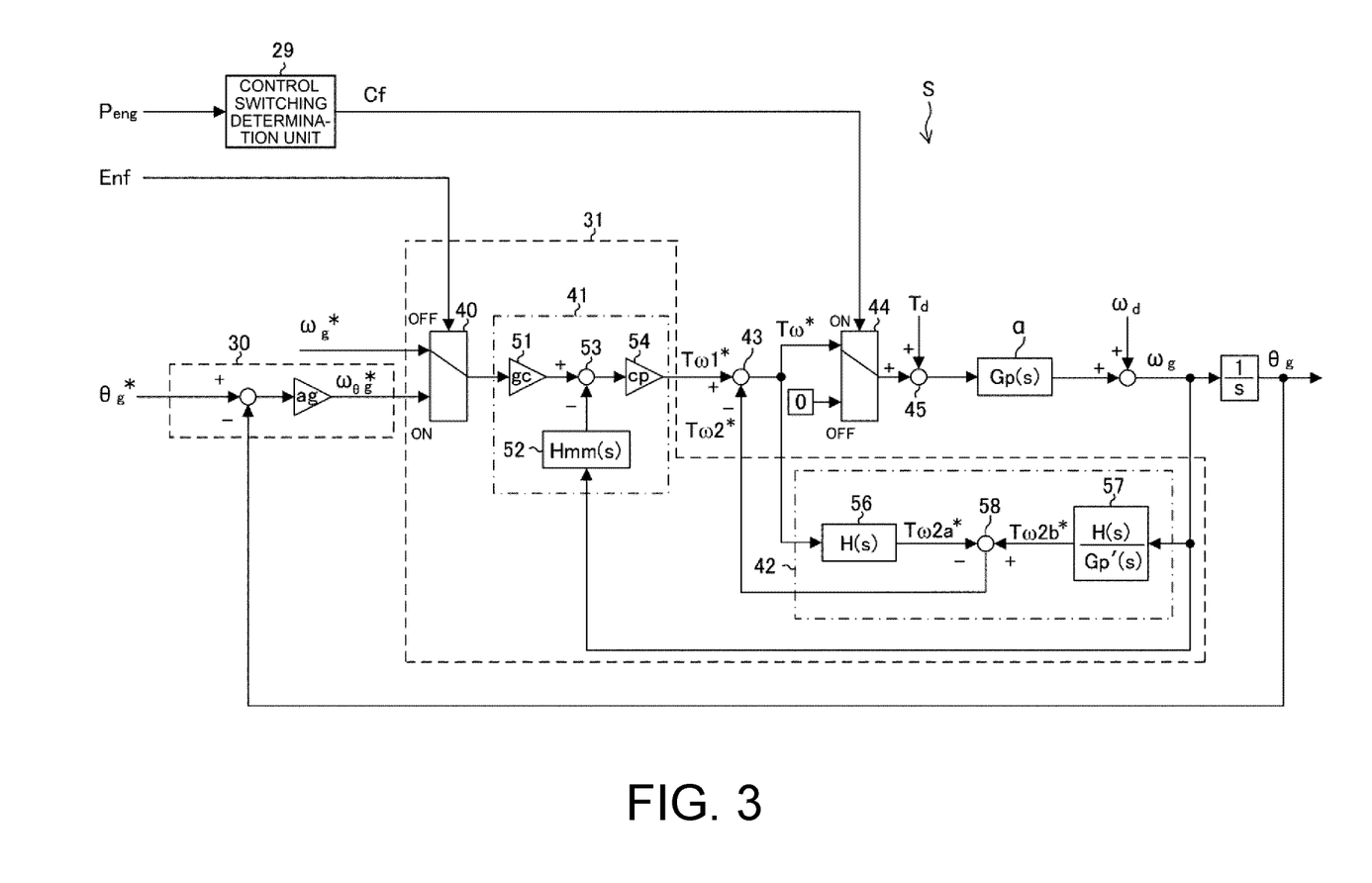
FIG. 3 is a block diagram showing a configuration of a main part of the generator system according to a first embodiment.

FIG. 3 is a block diagram showing a configuration of the main part of the generator system S. As shown in the drawing, the angle control unit 30 multiplies a deviation between an angle detection value $\theta_g$ and the angle command value $\theta_g^*$ by a gain ag to calculate the angle control rotation speed command value $\omega_{\theta g}^*$ by, for example, P control.

Here, the angle detection value $\theta_g$ is a detection value of a current rotation angle (mechanical angle) of the generator 18. The angle detection value $\theta_g$ can be acquired by integrating the rotation speed detection value $\omega_g$ detected by the rotation speed sensor 37. The angle command value $\theta_g^*$ is determined as a rotation angle of the generator 18 corresponding to the target stop position in the crank position control. That is, the angle command value $\theta_g^*$ is determined as a rotation angle of the output shaft of the generator 18 connected to the crankshaft when the crankshaft is at the target stop position.

On the other hand, the rotation speed control unit 31 includes a stop command flag reference unit 40, a model matching compensation unit 41, and a disturbance observer 42.

The stop command flag reference unit 40 refers to the engine stop request flag Enf, and outputs either the rotation speed command value $\omega_g^*$ or the angle control rotation speed command value $\omega_{\theta g}^*$ to the model matching compensation unit 41. More specifically, the stop command flag reference unit 40 outputs the rotation speed command value $\omega_g^*$ (a command value determined according to the target generated power) when the engine stop request flag Enf is OFF, and outputs the angle control rotation speed command value $\omega_{\theta g}^*$ (a command value for the crank position control) when the engine stop request flag Enf is ON. Note that for simplification of description, the following description of each processing is focused on a case where the angle control rotation speed command value $\omega_{\theta g}^*$ for the crank position control is output.

The model matching compensation unit 41 calculates a first torque target value $T_{\omega 1}^*$ that causes the rotation speed detection value $\omega_g$ to follow the angle control rotation speed command value $\omega_{\theta g}^*$ by, for example, PI control. Especially, the model matching compensation unit 41 includes a first model matching gain multiplication unit 51, a model matching filter 52, a subtractor 53, and a second model matching gain multiplication unit 54.

The first model matching gain multiplication unit 51 multiplies the angle control rotation speed command value $\omega_{\theta g}^*$ by a first model matching gain gc. The first model matching gain gc is expressed by the following equation (1) using a design value J' of a total inertia J, a design value C' of a viscous friction coefficient, and a time constant $T_m$ of a target response, which are converted into a generator shaft, in the generator 18 and the engine 17.

[Math. 1]

$$gc = \frac{J}{(J' - C' \cdot T_m)} \quad (1)$$

Note that the design value J' of the total inertia and the design value C' of the viscous friction coefficient are set to be equal to characteristics of an actual control target. In principle, the time constant $T_m$ is preferably determined so that the model matching compensation unit 41 responds as quickly as possible within a range in which control stability is not impaired.

The model matching filter 52 is a filter applied to the rotation speed detection value $\omega_g$ fed back to the model matching compensation unit 41. The model matching filter 52 is, for example, a low-pass filter, and is expressed by a transmission characteristic $H_{mm}(s)$ shown in the following equation (2). Here, "s" is a Laplace operator.

[Math. 2]

$$H_{mm}(s) = \frac{1}{T_m \cdot s + 1} \quad (2)$$

The subtractor 53 subtracts the rotation speed detection value $\omega_g$ processed by the model matching filter 52 (that is, $H_{mm}(s) \cdot \omega_g$) from the rotation speed command value $\omega_g^*$ multiplied by the first model matching gain gc (that is, $gc \cdot \omega_g^*$). The calculation result by the subtractor 53 is input to the second model matching gain multiplication unit 54.

The second model matching gain multiplication unit 54 multiplies the output of the subtractor 53 by a second model matching gain cp. The second model matching gain cp is expressed by the following equation (3).

[Math. 3]

$$cp = \frac{J' - C' \cdot T_m}{T_m} \quad (3)$$

The model matching compensation unit 41 outputs the output of the second model matching gain multiplication unit 54 as the first torque target value $T_{\omega 1}^*$ to a torque command value calculation unit 43. As described above, the first torque target value $T_{\omega 1}^*$ is a target value of the generator torque $T_\omega$ determined by model matching.

The disturbance observer 42 receives the basic torque command value $T_\omega^*$ and the rotation speed detection value $\omega_g$, and calculates a second torque target value $T_{\omega 2}^*$ corresponding to a disturbance torque estimation value in accordance with a control system model of the engine 17 and the generator 18.

Note that the basic torque command value $T_\omega^*$ is a basic command value of the generator torque $T_\omega$ determined from the viewpoint of bringing the crank position close to the target stop position while considering the influence of the disturbance torque $T_d$ during the crank position control. The disturbance torque $T_d$ is an input torque component from the engine 17 (more specifically, the crankshaft) to the generator 18 due to factors such as a compression reaction force, combustion torque pulsation, and abnormal combustion of the engine 17. That is, the disturbance torque $T_d$ strongly correlates with the cylinder internal pressure $P_{eng}$ of the engine 17.

Especially, in the present embodiment, the disturbance observer 42 includes a first disturbance observer filter 56, a second disturbance observer filter 57, and a subtractor 58.

The first disturbance observer filter 56 applies a low-pass filter H(s) expressed by the following equation (4) to the basic torque command value $T_\omega^*$ to calculate a first term (first element) $T_{\omega 2a}^*$ constituting the second torque target value $T_{\omega 2}^*$.

[Math. 4]

$$H(s) = \frac{1}{T_h \cdot s + 1} \quad (4)$$

Note that in the equation, "$T_h$" is a time constant of the disturbance observer 42 which is appropriately determined. That is, the first term $T_{\omega 2a}^*$ corresponds to an actual torque estimation value that does not include a disturbance component and is acquired based on the basic torque command value $T_\omega^*$.

The second disturbance observer filter 57 calculates a second term (second element) $T_{\omega 2b}^*$ constituting the second torque target value $T_{\omega 2}^*$ by applying a filter H(s)/Gp' (s) given by a ratio of the low-pass filter H(s) to the transmission characteristic Gp' (s) to the rotation speed detection value $\omega_g$. Note that the transmission characteristic Gp' (s) is a model of a transmission characteristic from the torque input to the rotation speed in the generator system S, and is expressed by the following equation (5).

[Math. 5]

$$G_p'(s) = \frac{1}{J' \cdot s + C'} \quad (5)$$

That is, the second term $T_{\omega 2b}^*$ corresponds to an actual torque estimation value including the disturbance component, which is acquired by applying an inverse system of the rotation speed from the torque input to the rotation speed detection value $\omega_g$.

The subtractor 58 subtracts the second term $T_{\omega 2b}^*$ from the first term $T_{\omega 2a}^*$ to calculate the second torque target value $T_{\omega 2}^*$. The subtractor 58 outputs the calculated second torque target value $T_{\omega 2}^*$ to the torque command value calculation unit 43.

The torque command value calculation unit 43 feeds back the second torque target value $T_{\omega 2}^*$ from the disturbance observer 42 to the first torque target value $T_{\omega 1}^*$ from the model matching compensation unit 41 to calculate the basic torque command value $T_\omega^*$. In the present embodiment, the torque command value calculation unit 43 is a subtractor, and calculates the basic torque command value $T_\omega^*$ by subtracting the second torque target value $T_{\omega 2}^*$ from the first torque target value $T_{\omega 1}^*$. Further, the torque command value calculation unit 43 outputs the calculated basic torque command value $T_\omega^*$ to the control maintenance flag reference unit 44.

The control maintenance flag reference unit 44 refers to the control maintenance flag Cf from the control switching determination unit 29 and outputs either the basic torque command values $T_\omega^*$ or 0. More specifically, the control maintenance flag reference unit 44 outputs the basic torque command value $T_\omega^*$ when the control maintenance flag Cf is ON (when the cylinder internal pressure $P_{eng}$ is equal to or greater than the threshold $P_{ength}$), and outputs 0 when the control maintenance flag Cf is OFF (when the cylinder internal pressure $P_{eng}$ is less than the threshold $P_{ength}$).

The adder 45 is configured to express that the disturbance torque $T_d$ affects the output value of the control maintenance flag reference unit 44.

Note that a control target a refers to all the control elements after the rotation speed control unit 31 in the generator system S, that is, the current command value calculation unit 32, the current control unit 33, the non-interference control unit 34, the current converter 35, the voltage converter 36, the generator inverter 20, and the generator 18.

Especially, the control target a can be expressed by a transfer function of the following equation (6) using the total inertia J and the viscous friction coefficient C of the generator 18 and the engine 17 converted into the generator shaft.

[Math. 6]

$$G_p(s) = \frac{1}{J \cdot s + C} \tag{6}$$

Further, a disturbance rotation speed $\omega_d$ detected/estimated by a detection/estimation device (not shown) is added to the rotation speed detection value $\omega_g$ output from the control target a, and a value acquired by the addition is fed back to the model matching compensation unit 41. Further, the angle detection value $\theta_g$ acquired by integrating the rotation speed detection value $\omega_g$ is fed back to the angle control unit 30.

According to the control logic described above, when the cylinder internal pressure $P_{eng}$ of the engine 17 is equal to or greater than the threshold $P_{ength}$, the final torque command value $T_\omega^{**}$ (the generator torque $T_\omega$) is determined by a sum of the basic torque command value $T_{\omega g}^*$, which corresponds to the angle control rotation speed command value $\omega_{\theta g}^*$ determined by the deviation of the angle detection value $\theta_g$ from the angle command value $\theta_g^*$, and the disturbance torque $T_d$. In this way, the generator 18 operates to bring the crank position close to the target stop position. Especially, in this case, even when the crank position reaches the target stop position ($\theta_g = \theta_g^*$) and then the basic torque command value $T_\omega^*$ becomes zero, the generator torque $T_\omega$ continues to output the disturbance torque $T_d$ corresponding to the remaining cylinder internal pressure $P_{eng}$ (the crank position control is maintained).

On the other hand, when the cylinder internal pressure $P_{eng}$ is less than the threshold $P_{ength}$, the generator torque $T_\omega$ is set equal to the disturbance torque $T_d$. When the crank position reaches the target stop position and the cylinder internal pressure $P_{eng}$ of the engine 17 decreases to a certain value or more, the disturbance torque $T_d$ (generator torque $T_\omega$) becomes substantially zero, and the crank position control is terminated.

The configuration and functions and effects of the generator control method according to the present embodiment described above will be collectively described.

The present embodiment provides a generator control method for controlling the generator 18 driven by the engine 17 via the crankshaft of the engine 17. In this generator control method, it is determined whether the engine 17 stops, and when it is determined that the engine 17 stops (when the engine stop request flag Enf is ON), the generator 18 is operated to adjust the crank position of the crankshaft to a prescribed target stop position. It is also determined whether the cylinder internal pressure $P_{eng}$ of the engine 17 is equal to or greater than a prescribed threshold $P_{ength}$ (control maintenance flag reference unit 44), and when the cylinder internal pressure $P_{eng}$ is equal to or greater than the threshold $P_{ength}$, the operation on the generator 18 is continued to maintain the crank position at the target stop position.

Accordingly, when the cylinder internal pressure $P_{eng}$ is equal to or greater than a prescribed value, the operation on the generator 18 (crank position control) is continued so as to maintain the crank position at the target stop position even after the crank position reaches the target stop position. Therefore, the deviation of the crank position due to the pressure remaining in the cylinder after the engine 17 stops can be prevented. That is, the crank position after the engine stops can be more reliably maintained at the target stop position.

Note that in the present embodiment, the generator controller 24 refers to the engine stop request flag Enf generated by the engine controller 25 to determine whether the engine 17 stops. However, the present invention is not limited thereto, and the generator controller 24 itself may adopt a logic for determining whether the engine 17 stops by referring to a detection value of the rotation speed of the generator 18 and/or the engine 17.

In the present embodiment, the disturbance torque $T_d$ corresponding to the disturbance input to the generator 18 is acquired, and the basic torque command value $T_\omega^*$ of the generator 18 is calculated based on a difference between the crank position and the target stop position (the model matching compensation unit 41 and the torque command value calculation unit 43). Then, when the cylinder internal pressure $P_{eng}$ is equal to or greater than the threshold $P_{ength}$, the generator torque $T_\omega$ is determined as the output torque of the generator 18 based on the basic torque command value $T_\omega^*$ and the disturbance torque $T_d$ (the control maintenance flag reference unit 44 and the adder 45).

In this way, in a scene in which the cylinder internal pressure $P_{eng}$ is equal to or greater than a certain value, the generator torque $T_\omega$ can be determined so that the crank position approaches the target stop position. On the other hand, even when the crank position reaches the target stop position (even when the basic torque command value $T_\omega^*$ becomes zero), it is possible to maintain the crank position at the target stop position by adjusting the generator torque $T_\omega$ to the input disturbance torque $T_d$. That is, a more specific control logic for maintaining the crank position at the target stop position is achieved when the cylinder internal pressure $P_{eng}$ is equal to or greater than the threshold $P_{ength}$.

Further, in the present embodiment, the crank position is estimated from the rotation angle detection value (angle detection value $\theta_g$) of the generator 18, and the rotation angle command value (angle command value $\theta_g^*$) of the generator 18 corresponding to the target stop position is determined. The difference between the crank position and the target stop position is determined as the deviation between the angle detection value $\theta_g$ and the angle command value $\theta g^*$ (angle control unit 30).

In this way, the crank position control can be executed using the parameters in the control system of the generator 18. That is, a control logic capable of executing the crank position control without using a parameter (a detection value of a crank angle $\theta_e$ or the like) corresponding to the crank position in the control system of the engine 17 is achieved.

In the present embodiment, the first torque target value $T_{\omega 1}^*$ of the generator 18 is calculated such that the angle detection value $\theta_g$ follows the angle command value $\theta_g^*$ (the angle control unit 30 and the model matching compensation unit 41). Further, the rotation speed detection value $\omega_g$ of the generator 18 is processed by the disturbance observer 42 to calculate the second torque target value $T_{\omega 2}^*$ as a disturbance torque estimation value according to the control system model (disturbance observer 42).

Then, when the cylinder internal pressure $P_{eng}$ is equal to or greater than the threshold $P_{ength}$, the generator torque $T_\omega$ is set to the basic torque command value $T_\omega^*$. On the other hand, when the cylinder internal pressure $P_{eng}$ is less than the threshold $P_{ength}$, the generator torque $T_\omega$ is set equal to the disturbance torque $T_d$ (control maintenance flag reference unit 44).

Therefore, a more specific control logic for appropriately completing the crank position control in a scene in which the cylinder internal pressure $P_{eng}$ is equal to or lower than a certain value while adjusting the crank position to the target stop position in a scene in which the cylinder internal pressure $P_{eng}$ is equal to or greater than a certain value is achieved.

Furthermore, the present embodiment provides a generator controller 24 that functions as a generator control device suitable for executing the generator control method.

The generator controller 24 includes a stop determination unit that determines whether the engine 17 stops, a control unit (41, 42, 43, 45) that adjusts the crank position of the crankshaft to a prescribed target stop position by operating the generator 18 when it is determined that the engine 17 stops (when the engine stop request flag Enf is ON), a cylinder internal pressure determination unit (control maintenance flag reference unit 44) that determines whether the cylinder internal pressure $P_{eng}$ of the engine 17 is equal to or greater than the prescribed threshold $P_{ength}$, and a control maintaining unit (adder 45) that maintains the crank position at the target stop position by continuing the operation on the generator 18 when the cylinder internal pressure $P_{eng}$ is equal to or greater than the threshold $P_{ength}$.

Second Embodiment

Hereinafter, a second embodiment will be described. Note that the same elements as those in the first embodiment are denoted by the same reference numerals, and the description thereof will be omitted.

Figure 4:
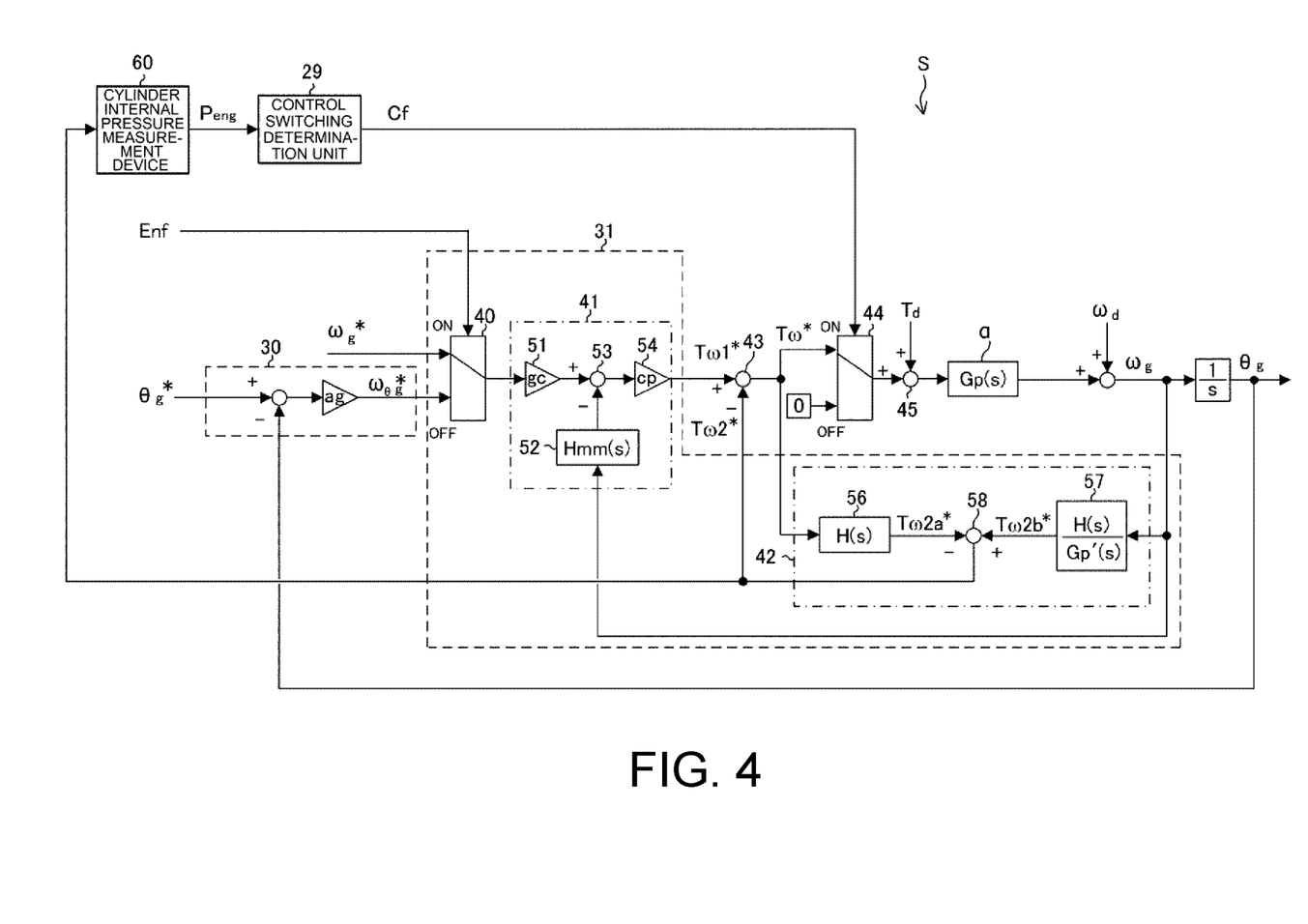
FIG. 4 is a block diagram showing a configuration of a main part of the generator system according to a second embodiment.

FIG. 4 is a block diagram showing a configuration of the main part of the generator system S in the present embodiment. As shown in the drawing, the generator system S of the present embodiment includes a cylinder internal pressure measurement device 60 for estimating the cylinder internal pressure $P_{eng}$ of the engine 17.

Especially, the cylinder internal pressure measurement device 60 acquires the second torque target value $T_{\omega 2}^*$ from the disturbance observer 42, and calculates the cylinder internal pressure $P_{eng}$ from the second torque target value $T_{\omega 2}^*$. That is, the second torque target value $T_{\omega 2}^*$ is an estimation value of the disturbance torque $T_d$ input to the generator 18, and is also correlated with the cylinder internal pressure $P_{eng}$ (more specifically, the reaction force input from the engine 17 to the generator 18 via the crankshaft). Therefore, the cylinder internal pressure $P_{eng}$ can be estimated from the second torque target value $T_{\omega 2}^*$ by a method of referring to a map prescribed based on characteristics of the engine 17, the generator 18, and the driving force transmission system between the engine 17 and the generator 18.

Then, using the cylinder internal pressure $P_{eng}$ estimated by the cylinder internal pressure measurement device 60, the processing in the control maintenance flag reference unit 44 is executed as in the first embodiment.

As described above, in the generator control method of the present embodiment, the cylinder internal pressure $P_{eng}$ is estimated based on the second torque target value $T_{\omega 2}^*$.

In this way, even when the cylinder internal pressure $P_{eng}$ of the engine 17 cannot be directly measured, the cylinder internal pressure $P_{eng}$ can be estimated using the second torque target value $T_{\omega 2}^*$, which is an output of the disturbance observer 42, and the control after the control maintenance flag reference unit 44 can be executed.

Third Embodiment

Hereinafter, a third embodiment will be described. Note that the same elements as those in the first or second embodiment are denoted by the same reference numerals, and the description thereof will be omitted.

Figure 5:
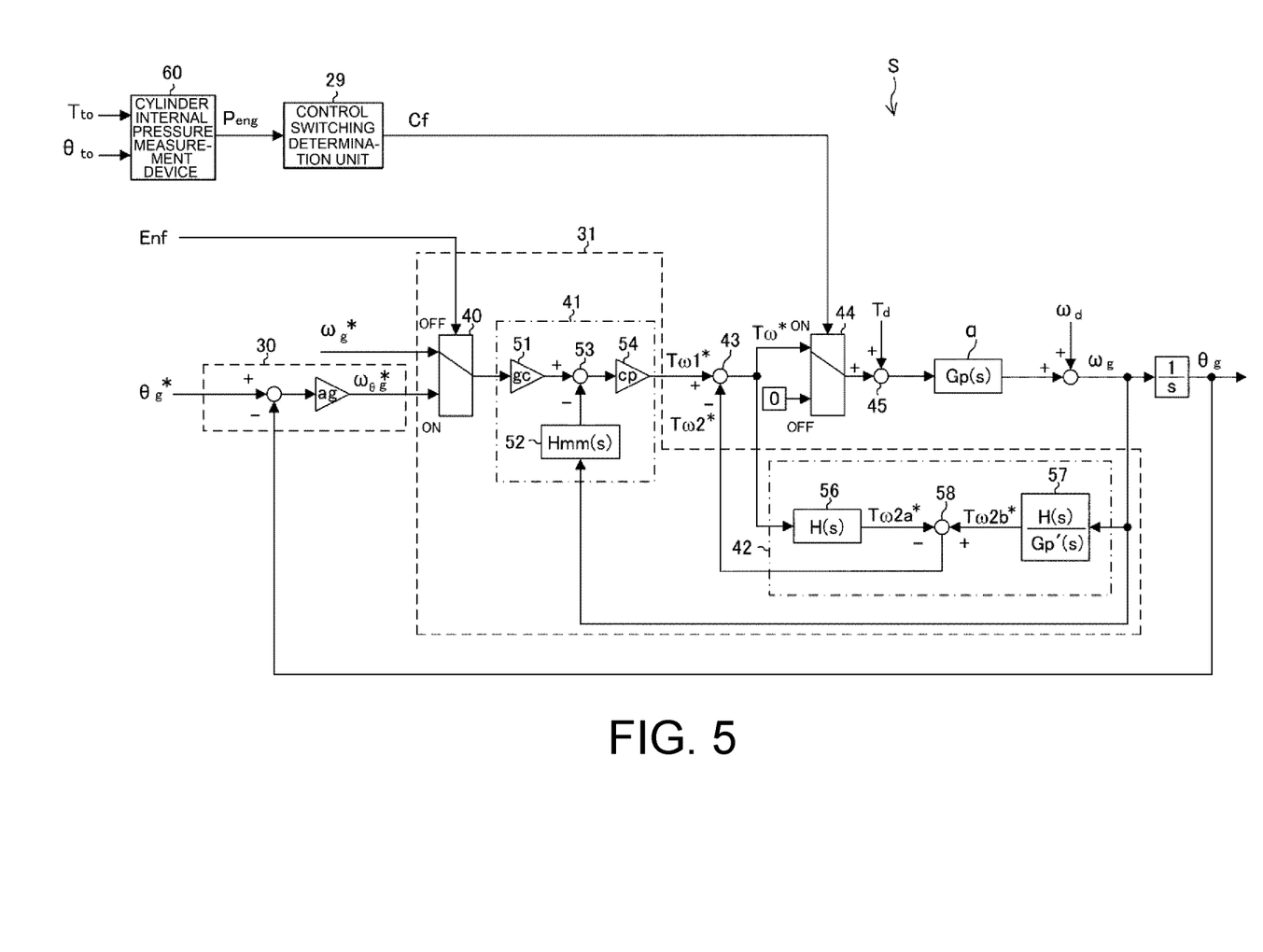
FIG. 5 is a block diagram showing a configuration of a main part of the generator system according to a third embodiment.

FIG. 5 is a block diagram showing a configuration of the main part of the generator system S in the present embodiment. As shown in the drawing, the generator system S of the present embodiment also includes the cylinder internal pressure measurement device 60 for estimating the cylinder internal pressure $P_{eng}$ of the engine 17 as in the second embodiment.

On the other hand, the cylinder internal pressure measurement device 60 of the present embodiment estimates the cylinder internal pressure $P_{eng}$ using a torsional torque $T_{to}$ and a torsional angle $\theta_{to}$ received. The torsional torque $T_{to}$ is a torque corresponding to a torsional load between the output shaft (rotor) of the generator 18 and the crankshaft of the engine 17. The torsional angle $\theta_{to}$ corresponds to torsional displacement between the output shaft of the generator 18 and the crankshaft.

Note that the cylinder internal pressure measurement device 60 may estimate the cylinder internal pressure $P_{eng}$ by using only one of the torsional torque $T_{to}$ and the torsional angle $\theta_{to}$ received.

According to the configuration of the present embodiment, one aspect of a specific means for estimating the cylinder internal pressure $P_{eng}$ used for executing the above-described crank position control is achieved.

Fourth Embodiment

Hereinafter, a fourth embodiment will be described. Note that the same elements as those in the first to third embodiments are denoted by the same reference numerals, and the description thereof will be omitted.

Figure 6:
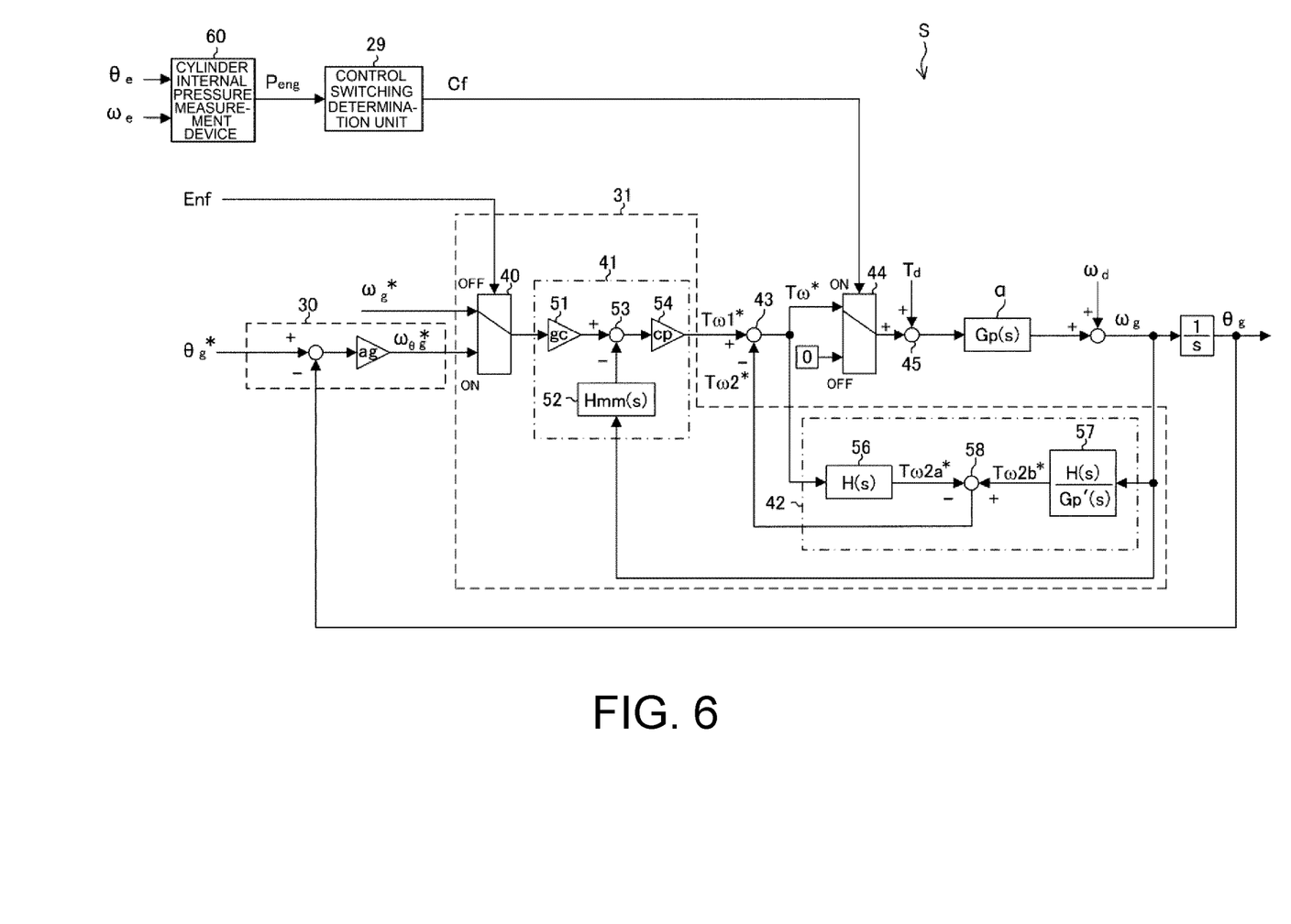
FIG. 6 is a block diagram showing a configuration of a main part of the generator system according to a fourth embodiment.

FIG. 6 is a block diagram showing a configuration of the main part of the generator system S in the present embodiment. As shown in the drawing, the generator system S of the present embodiment also includes the cylinder internal pressure measurement device 60 for estimating the cylinder internal pressure $P_{eng}$ of the engine 17 as in the second and third embodiment.

On the other hand, the cylinder internal pressure measurement device 60 of the present embodiment estimates the cylinder internal pressure $P_{eng}$ by using the crank angle $\theta_e$ and the crank angular velocity $\omega_e$ of the engine 17 received. In this way, one aspect of a specific means for estimating the cylinder internal pressure $P_{eng}$ is achieved.

Note that the cylinder internal pressure measurement device 60 may estimate the cylinder internal pressure $P_{eng}$ by only one of the received crank angle $\theta_e$ and the crank angular velocity $\omega_e$.

According to the configuration of the present embodiment, one aspect of a specific means for estimating the cylinder internal pressure $P_{eng}$ used for executing the above-described crank position control is achieved.

Modification of Fourth Embodiment

In the present modification, the control switching determination unit 29 sets the control maintenance flag Cf to ON (determines that the cylinder internal pressure $P_{eng}$ is less than the threshold $P_{ength}$) when a state in which the crank angular velocity We acquired from the cylinder internal pressure measurement device 60 is equal to or less than a prescribed value $\omega_{eth}$ continues for a prescribed time $\Delta t$ or longer, and otherwise, sets the control maintenance flag Cf to OFF (determines that the cylinder internal pressure $P_{eng}$ is equal to or greater than the threshold $P_{ength}$).

Note that the prescribed value $\omega_{eth}$ is determined through experiments or the like as a value of the crank angular velocity $\omega_e$ when the cylinder internal pressure $P_{eng}$ reaches the threshold $P_{ength}$. The prescribed time $\Delta t$ is set to an appropriate value for eliminating a situation in which the crank angular velocity $\omega_e$ is temporarily determined to be equal to or less than the prescribed value $\omega_{eth}$ due to any factor even when the cylinder internal pressure $P_{eng}$ is actually equal to or greater than the threshold $P_{ength}$.

As described above, in the generator control method of the present modification, it is determined whether the cylinder internal pressure $P_{eng}$ is equal to or greater than the threshold $P_{ength}$ based on a comparison between the crank angular velocity $\omega_e$ and the prescribed value $\omega_{eth}$. Especially, when the state in which the crank angular velocity we is equal to or greater than the prescribed value $\omega_{eth}$ continues shorter than the prescribed time $\Delta t$, it is determined that the cylinder internal pressure $P_{eng}$ is equal to or greater than the threshold $P_{ength}$.

In this way, although the cylinder internal pressure $P_{eng}$ of the engine 17 is actually high, it is possible to more reliably avoid a situation in which the crank angular velocity de temporarily becomes equal to or less than the prescribed value $\omega_{eth}$ and the cylinder internal pressure $P_{eng}$ is determined to be low, and then the crank position control is terminated.

[Control Results]

Hereinafter, control results according to the embodiments (examples) will be described in comparison with control results according to a comparative example.

Comparative Example

Figure 7:
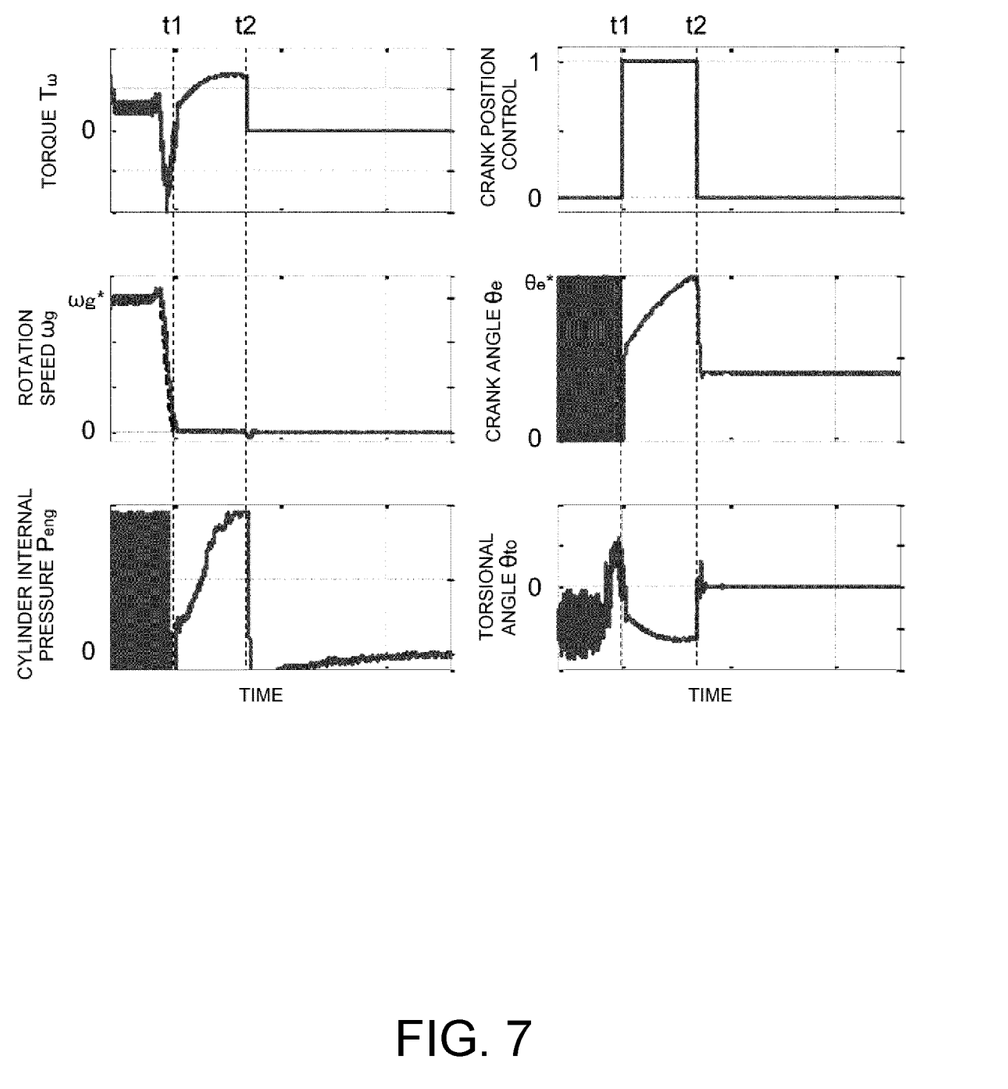
FIG. 7 is a timing chart showing a control result by control of a comparative example.

FIG. 7 is a timing chart illustrating the control results of the comparative example. The control according to the comparative example is different from the control logics according to the above embodiments in that the crank position control is started with the detection of the engine stop command as a base point (time t1) regardless of whether the cylinder internal pressure $P_{eng}$ of the engine 17 is high or low, and the crank position control is ended at a timing (time t2) at which the crank position (crank angle $\theta_e$) becomes the target stop position (target crank angle $\theta_e^*$).

As illustrated, in the control of the comparative example, before the time t1, the generator 18 operates such that the rotation speed follows the rotation speed command value $\omega_g^*$. On the other hand, after the time t1, the crank position control is started, and the generator 18 operates such that the crank angle de approaches the target crank angle $\theta_e^*$ (such that the angle detection value $\theta_g$ of the generator 18 follows the angle command value $\theta_g^*$). Then, when the crank angle $\theta_e$ reaches the target crank angle $\theta_e$ at the time t2, the crank position control is terminated. Here, at the time t2 at which the crank position control is terminated, the cylinder internal pressure $P_{eng}$ is higher than a certain value. Therefore, due to the influence of the remaining cylinder internal pressure $P_{eng}$ even after the end of the crank position control, the crank angle $\theta_e$ deviates from the target crank angle $\theta_e^*$, and a settling error occurs.

EXAMPLES

Figure 8:
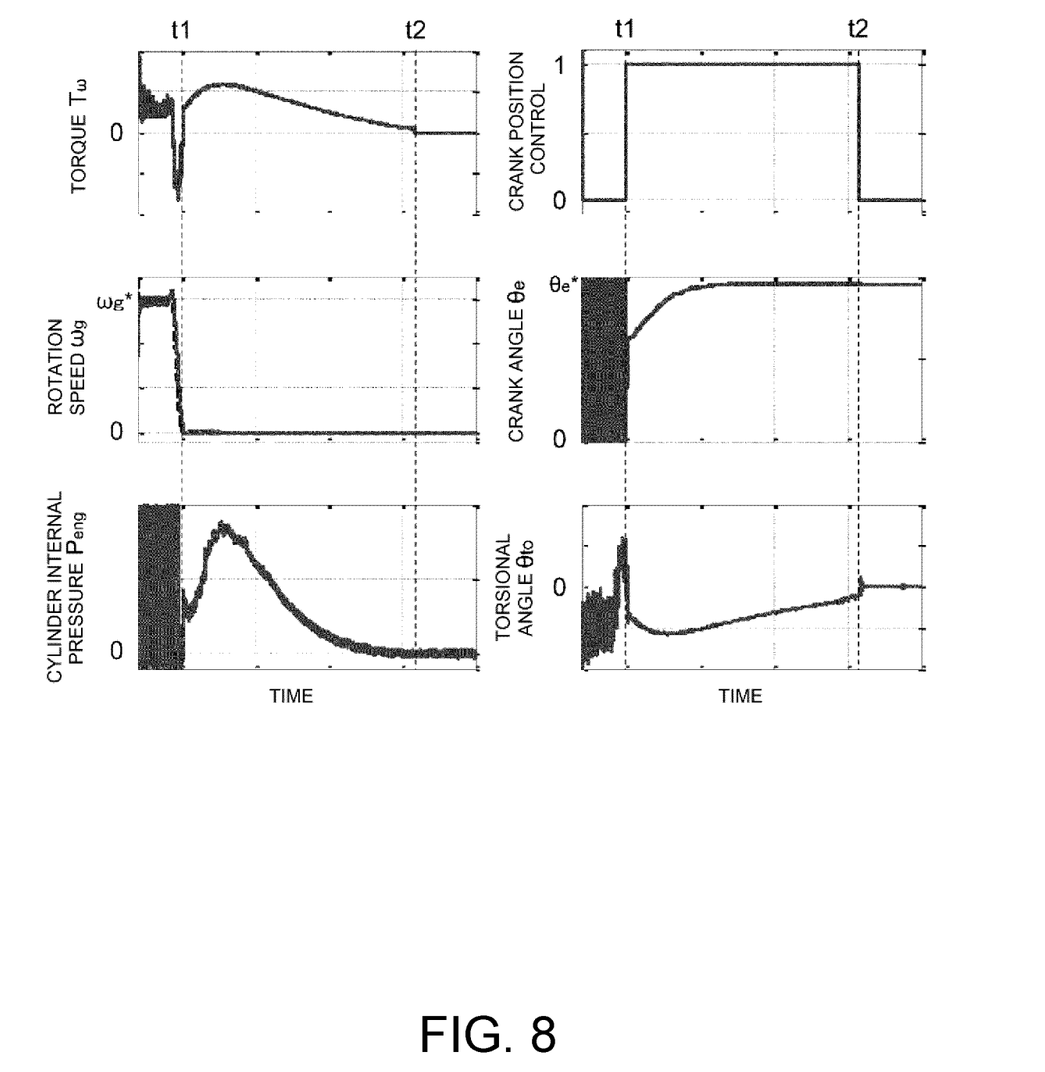
FIG. 8 is a timing chart showing a control result by control of the embodiments.

FIG. 8 is a timing chart illustrating the control results of the examples. As shown in the drawing, in the control of the examples, even when the crank angle $\theta_e$ reaches the target crank angle $\theta_e^*$, the crank position control continues if the cylinder internal pressure $P_{eng}$ is equal to or greater than a certain value. Then, the crank position control is terminated at the time t2 when the cylinder internal pressure $P_{eng}$ becomes equal to or less than the prescribed value. In this way, after the end of the crank position control, the crank angle $\theta_e$ is more reliably maintained at the target crank angle $\theta_e^*$.

Although the embodiments of the present invention have been described above, the configurations described in the above-mentioned embodiments and modification are merely examples of applications of the present invention, and are not intended to limit the technical scope of the invention.

For example, in the above embodiments, the generator control method executed by the generator system S mounted on the electric vehicle 100 has been described. However, the generator control method according to the present invention can be similarly executed by adopting the generator system S in a vehicle other than the electric vehicle 100 or in other devices.

The invention claimed is:

1. A generator control method for controlling a generator driven by an engine via a crankshaft of the engine, the generator control method comprising:
   determining whether the engine stops;
   responsive to determining that the engine has stopped, operating the generator to adjust a crank position of the crankshaft to a prescribed target stop position;
   determining whether a cylinder internal pressure of the engine is equal to or greater than a prescribed threshold;
   responsive to determining that the cylinder internal pressure is equal to or greater than the threshold while the crank position is at the target stop position, continuing the operation on the generator to maintain the crank position at the target stop position;
   responsive to determining that the cylinder internal pressure is less than the threshold while the crank position is at the target stop position, terminating the adjustment of the crank position by the generator to maintain the crank position at the target stop position;
   acquiring a disturbance torque corresponding to disturbance input to the generator;
   calculating a basic torque command value of the generator based on a difference between the crank position and the target stop position;
   responsive to determining that the cylinder internal pressure is equal to or greater than the threshold, determining an output torque of the generator based on the basic torque command value and the disturbance torque;
   estimating the crank position from a rotation angle detection value of the generator;
   determining a rotation angle command value of the generator according to the target stop position;
   determining the difference between the crank position and the target stop position as a deviation between the rotation angle detection value and the rotation angle command value;
   calculating a first torque target value of the generator such that the rotation angle detection value follows the rotation angle command value;
   calculating a second torque target value as a disturbance torque estimation value corresponding to a control system model by processing a rotation speed detection value of the generator by a disturbance observer filter;
   calculating the basic torque command value by subtracting the second torque target value from the first torque target value; and
   responsive to determining that the cylinder internal pressure is equal to or greater than the threshold, setting the output torque of the generator to the basic torque command value.

2. The generator control method according to claim 1, further comprising:
   estimating the cylinder internal pressure based on the second torque target value.

3. The generator control method according to claim 1, further comprising:
   estimating the cylinder internal pressure based on a torsional torque corresponding to a torsional load between the crankshaft and the generator and/or a torsional angle corresponding to a torsional displacement between the crankshaft and the generator.

4. The generator control method according to claim 1, further comprising:
   estimating the cylinder internal pressure based on a crank angle and/or a crank angular velocity of the crankshaft.

5. The generator control method according to claim 4, further comprising:
   determining whether the cylinder internal pressure is equal to or greater than the threshold based on a comparison between the crank angular velocity and a prescribed value; and
   determining that the cylinder internal pressure is equal to or greater than the threshold responsive to determining that a state in which the crank angular velocity is equal to or greater than the prescribed value continues less than a prescribed time.

6. A generator control device for controlling a generator driven by an engine via a crankshaft of the engine, the generator control device comprising:
   a stop determination unit configured to determine whether the engine has stopped;
   a control unit configured to:
      responsive to determining that the engine has stopped, operate the generator to adjust a crank position of the crankshaft to a prescribed target stop position; and
      acquire a disturbance torque corresponding to disturbance input to the generator;
   an angle control unit configured to:
      determine a rotation angle command value of the generator according to the target stop position; and
      estimate the crank position from a rotation angle detection value of the generator;
   a cylinder internal pressure determination unit configured to determine whether a cylinder internal pressure of the engine is equal to or greater than a prescribed threshold; and
   a control maintaining unit configured to:
      responsive to determining that the cylinder internal pressure is equal to or greater than the threshold while the crank position is at the target stop position, continue the operation on the generator to maintain the crank position at the target stop position; and
      responsive to determining that the cylinder internal pressure is less than the threshold while the crank position is at the target stop position, terminating the adjustment of the crank position by the generator to maintain the crank position at the target stop position;
   wherein the control unit is configured to:
      calculate a basic torque command value of the generator based on a difference between the crank position and the target stop position;
      calculate a first torque target value of the generator such that the rotation angle detection value follows the rotation angle command value;
      calculate a second torque target value as a disturbance torque estimation value corresponding to a control system model by processing a rotation speed detection value of the generator by a disturbance observer filter;
      calculate the basic torque command value by subtracting the second torque target value from the first torque target value;
      responsive to determining that the cylinder internal pressure is equal to or greater than the threshold, determine an output torque of the generator based on the basic torque command value and the disturbance torque; and responsive to determining that the cylinder internal pressure is equal to or greater than the threshold, setting the output torque of the generator to the basic torque command value;

wherein the angle control unit is configured to:
determine the difference between the crank position and the target stop position as a deviation between the rotation angle detection value and the rotation angle command value.

7. A generator control method for controlling a generator driven by an engine via a crankshaft of the engine, the generator control method comprising:

determining whether the engine stops;
responsive to determining that the engine has stopped, operating the generator to adjust a crank position of the crankshaft to a prescribed target stop position;
determining whether a cylinder internal pressure of the engine is equal to or greater than a prescribed threshold;
responsive to determining that the cylinder internal pressure is equal to or greater than the threshold while the crank position is at the target stop position, continuing the operation on the generator to maintain the crank position at the target stop position;
acquiring a disturbance torque corresponding to disturbance input to the generator;
calculating a basic torque command value of the generator based on a difference between the crank position and the target stop position;
responsive to determining that the cylinder internal pressure is equal to or greater than the threshold, determining an output torque of the generator based on the basic torque command value and the disturbance torque;
estimating the crank position from a rotation angle detection value of the generator;
determining a rotation angle command value of the generator according to the target stop position;
determining the difference between the crank position and the target stop position as a deviation between the rotation angle detection value and the rotation angle command value;
calculating a first torque target value of the generator such that the rotation angle detection value follows the rotation angle command value;
calculating a second torque target value as a disturbance torque estimation value corresponding to a control system model by processing a rotation speed detection value of the generator by a disturbance observer filter;
calculating the basic torque command value by subtracting the second torque target value from the first torque target value;
responsive to determining that the cylinder internal pressure is equal to or greater than the threshold, setting the output torque of the generator to the basic torque command value; and
responsive to determining that the cylinder internal pressure is less than the threshold, setting the output torque of the generator to be equal to the disturbance torque.

* * * * *